(12) United States Patent
Yamakura et al.

(10) Patent No.: US 7,268,976 B2
(45) Date of Patent: Sep. 11, 2007

(54) MAGNETIC HEAD AND METHOD OF MANUFACTURING THE SAME

(75) Inventors: Hideo Yamakura, Yokohama (JP); Toshio Tamura, Yokohama (JP); Koji Tanaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/519,644

(22) Filed: Sep. 11, 2006

(65) Prior Publication Data

US 2007/0008660 A1    Jan. 11, 2007

Related U.S. Application Data

(63) Continuation of application No. 10/025,154, filed on Dec. 18, 2001, now Pat. No. 7,149,061.

(30) Foreign Application Priority Data

Jul. 31, 2001    (JP) .............................. 2001-230767

(51) Int. Cl.
    *G11B 5/33*    (2006.01)
(52) U.S. Cl. ..................................... 360/316

(58) Field of Classification Search ................ 360/316, 360/128
See application file for complete search history.

(56) References Cited

U.S. PATENT DOCUMENTS 6,760,197 B2 *    7/2004    Boutaghou et al. ......... 360/316

OTHER PUBLICATIONS

Using Magneto-Resistive Head Transducers as Lapping Transducers and a Parallel Resistor System to Calculate Lapping Constants, Sep. 1, 1993, IBM, vol. 36, Issue 9A, pp. 79-82.*

* cited by examiner

*Primary Examiner*—David Davis
(74) *Attorney, Agent, or Firm*—Townsend and Townsend and Crew LLP

(57) ABSTRACT

A thin-film includes an inductive element and a first and second magneto-resistive effect elements in which the first and second magneto-resistive effect elements are arranged in proximity to each other on a substrate, and one surface of the substrate perpendicular to the surface formed with the first and second magneto-resistive effect elements constitutes a slider surface, thereby providing appropriate height of the magneto-resistive effect elements.

8 Claims, 9 Drawing Sheets

3

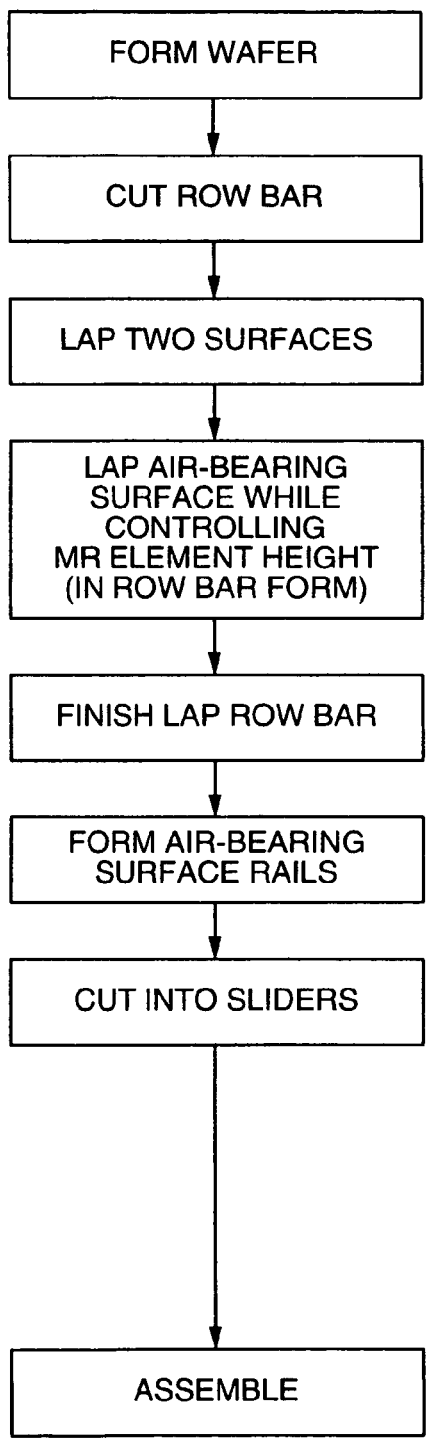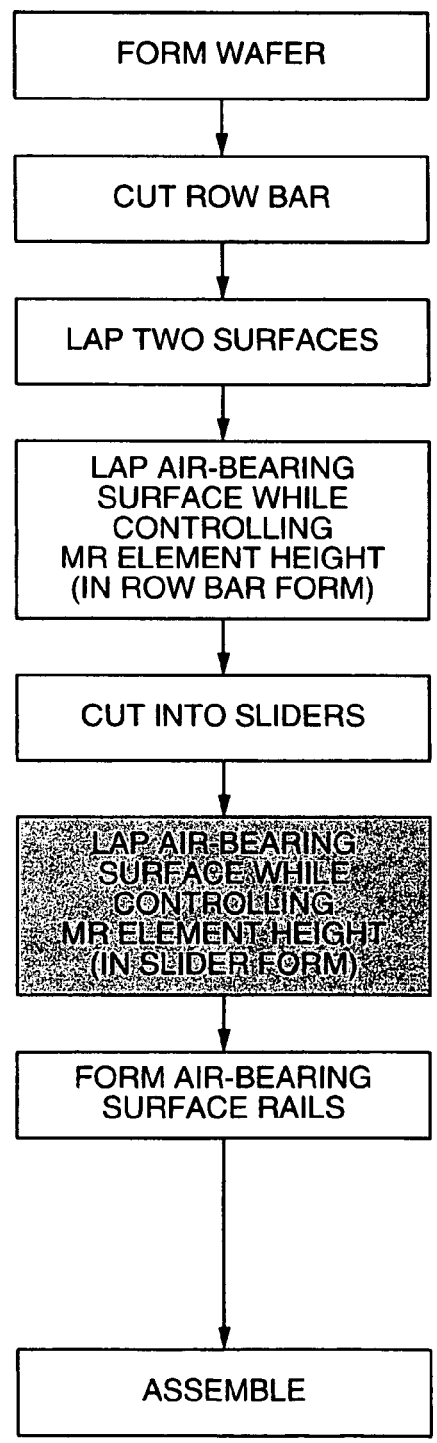

GMR ELEMENT HEIGHT
(CONVERTED FROM RESISTANCE VALUE)
hMR(μm)

GMR ELEMENT HEIGHT
(CONVERTED FROM RESISTANCE VALUE)
hMR(μm)

MAGNETIC HEAD AND METHOD OF MANUFACTURING THE SAME

BACKGROUND OF THE INVENTION

The present invention relates to a thin-film magnetic head having magneto-resistive effect elements, or in particular to a structure and a method of manufacturing a thin-film magnetic head for controlling the height of the magneto-resistive effect elements with high accuracy.

In recent years, the size of the magnetic disk drive has been ever on the decrease with the capacity thereof even on the increase, and small-sized magnetic disk drives using a 3.5-inch disk and 2.5-inch disk, respectively, are now the main stream. Among the magnetic heads used for these small-sized magnetic disk drives, the magnetic induction head of which the read output depends on the rotational speed of the disk has too small a disk rotational speed to produce a sufficient read output. With a magneto-resistive effect head using a magneto-resistive effect element having a resistance value changing with the magnetic field, on the other hand, the read output is not dependent on the rotational speed of the disk, and therefore a large read output can be produced. Also, the magneto-resistive effect head can produce a high read output as compared with the magnetic induction head even for the narrow tracks resulting from the high density, and therefore is considered suitable for the small size and the large capacity.

The magneto-resistive effect head is classified into a MR (magneto-resistive) head having a MR element, a GMR (giant magneto-resistive) head having a GMR element and a TMR (tunneling magneto-resistive) head having a TMR element. These magnetic heads having three different types of structure will hereinafter be referred to collectively as the MR head.

In the structure of the MR head having the highest efficiency of reproducing the information signal recorded in the disk, the magneto-resistive effect element is used exposed to the surface (hereinafter referred to as "the air bearing surface") of the slider having the MR head mounted thereon in opposed relation to the disk to detect the resistance change of the magneto-resistive effect element in accordance with the change in the magnetic field. With the MR head with the magneto-resistive effect elements exposed to the air-bearing surface, the end of each magneto-resistive effect element is exposed to the air-bearing surface by lapping a part of the magneto-resistive effect element at the time of machining the air-bearing surface.

The size of the magneto-resistive effect element in the direction perpendicular to the air-bearing surface is called the height of the magneto-resistive effect element (MR element height). This MR element height is controlled by the lapping process. The read output of the magneto-resistive effect head changes with the MR element height. Therefore, variations of the MR element height are reflected directly in the variations in the read output of the magnetic head. For suppressing the variations of the read output of the magnetic head, it is necessary to control the MR element height with high accuracy in the lapping process.

The smaller the MR element height, the higher the performance of the magnetic head. The improved performance of the magnetic head makes it possible to detect the information recorded in the disk with higher sensitivity. Thus, the MR element height is ever on the decrease. Currently, an ordinary MR element has a height of 0.2 to 0.6 µm. The MR element height of the magnetic disk drive having an areal density of not less than 100 Gbits/in$^2$ is said to be not more than 0.1 µm. This MR element height is considered to require the machining accuracy of ±0.02 µm (for the areal density of not less than 100 Gbits/in$^2$).

Methods of lapping the MR element to the required height with high accuracy are described in JP-A-63-191570, JP-A-10-49824 and JP-A-10-208214. Generally in these methods, a measurement pattern (called "the electric lapping guide element") separate from the MR element is used in the element forming process, and as a general practice, the measurement of the resistance value is converted to the MR element height. As a control method, on the other hand, the MR element heights converted from the resistance values of scores of electric lapping guide elements formed in a row bar are approximated by the quadratic curve or the quaternary curve, and the load imposed on the row bar during the lapping process is controlled in such a manner as to reduce the inclination component, the quadratic curve component and the swell component of the approximated curve.

SUMMARY OF THE INVENTION

The technique described above has the disadvantage that an error of accuracy of machining for achieving the required MR element height is caused by the following factors:

(1) An error in forming an exposure mask used for forming the magneto-resistive effect elements and the electric lapping guide elements on a substrate and the exposure error in the exposure process thereof.

(2) An error caused by the difference in the lapping amount due to the distance between the positions of the magneto-resistive effect elements and the electric lapping guide element to be formed.

(3) An error caused by the inclination component, quadratic curve component and the swell component in the MR element height distribution in the row bar that cannot be corrected in the air-bearing surface lapping process.

(4) An error in converting the resistance value detected by the electric lapping guide element to the MR element height.

(5) A stopping dimension error caused at the end of the machining process when the resistance value detected by the electric lapping guide element or the MR element height converted from the particular resistance value has reached a predetermined value.

(6) Variations in the machining amount caused in the finish lapping process for the air-bearing surface carried out in the form of row bar after the lapping process executed while controlling the MR element height.

These error factors make it very difficult to achieve the accuracy of not more than ±0.02 µm for the height of the magneto-resistive effect elements in spite of the fact that there is a great need of realizing a compact magnetic disk drive of large capacity. Specifically, as described in JP-A-10-49824 and JP-A-10-208214, the electric lapping guide element for monitoring the lapping amount is arranged adjacent to the magneto-resistive effect elements. Since the lapping process is carried out in the form of row bar, however, it is difficult to independently control the information obtained from individual electric lapping guide elements and feed it back to the lapping amount of the magneto-resistive effect elements individually. As a result, the height of the magneto-resistive effect elements actually obtained has considerable variations, and it has been utterly impossible to realize the accuracy of not more than ±0.02 µm.

The object of the present invention is to provide a structure of a magnetic head of which the MR element height can be machined with high accuracy and a method of manufacturing the magnetic head.

According to a first aspect of the invention, there is provided a thin-film magnetic head comprising a substrate formed with an insulating film, and a first magneto-resistive effect element and a second magneto-resistive effect element formed above and in proximity to the substrate, wherein the surface of the substrate perpendicular to another surface thereof formed with the first magneto-resistive effect element and the second magneto-resistive effect element constitutes a slider surface in opposed relation to a magnetic recording medium.

According to another aspect of the invention, there is provided a thin-film magnetic head, wherein the first magneto-resistive effect element and the second magneto-resistive effect element include a first magneto-resistive effect film and a second magneto-resistive effect film, respectively, wherein each film is sandwiched by electrodes, and an end of each of the magneto-resistive effect films is exposed to the slider surface, and wherein the two electrode sets and the magneto-resistive effect films are formed in the same geometric shape.

According to still another aspect of the invention, there is provided a thin-film magnetic head, wherein the first magneto-resistive effect element has a first magneto-resistive effect film formed between a lower shield and an upper shield, and these components are stacked on the substrate, and wherein the second magneto-resistive effect element is formed in the plane in which the first magneto-resistive effect film is formed.

According to yet another aspect of the invention, there is provided a method of manufacturing a magnetic head, comprising the steps of forming first magneto-resistive effect elements and second magneto-resistive effect elements on a substrate formed with an insulating film, cutting the resulting assembly into a plurality of sliders each containing a first magneto-resistive effect element and a second magneto-resistive effect element, mounting at least a slider on a lapping machine, and lapping independently the surface of each slider perpendicular to the first magneto-resistive effect element and the second magneto-resistive effect element.

In this method of manufacturing a thin-film magnetic head, the slider surface is lapped while using the first magneto-resistive effect element as a means for reproducing (reading) the magnetic signal from a magnetic recording medium, and the second magneto-resistive effect element as a means for measuring the lapping amount of the slider surface. Also, the resistance value of the second magneto-resistive effect element is detected, and when the particular resistance value or the height of the second magneto-resistive effect element converted from the resistance value reaches a predetermined value, the lapping process is completed.

Also, at least one slider is mounted on the lapping machine, the resistance value of the second magneto-resistive effect element formed is detected for each slider, and when the particular resistance value or the height of the second magneto-resistive effect element converted from the resistance value reaches a predetermined value, the lapping process for the slider is completed.

As described above, one of the two magneto-resistive effect elements arranged for each slider is used for measuring the lapping amount of the slider, and when the resistance value or the height of the magneto-resistive effect element converted from the resistance value reaches a predetermined value, the lapping process of the particular slider is completed. It is thus possible to realize a thin-film magnetic head having the height of the magneto-resistive effect elements controlled with a high accuracy.

BRIEF DESCRIPTION OF THE DRAWINGS

These and other features, objects and advantages of the present invention will become more apparent from the following description when taken in conjunction with the accompanying drawings wherein:

FIGS. 8A and 8B show a flow of the lapping process according to the prior art and an embodiment of the invention, respectively;

DESCRIPTION OF THE EMBODIMENTS

Figure 1:
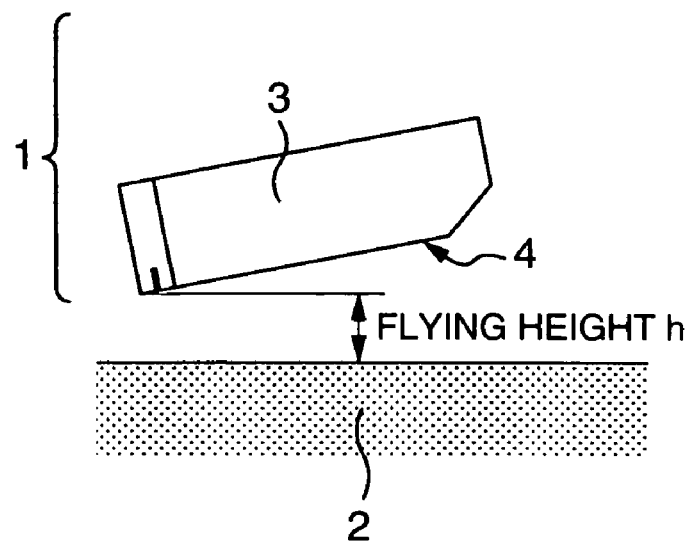
FIG. 1 is a layout diagram showing the relation between a magnetic head and a disk.

First, an outline of a magnetic disk drive will be explained. FIG. 1 is a diagram for explaining the layout of a magnetic head 1 and a disk 2. The magnetic head 1 is configured of a slider 3 and a magneto-resistive effect element 5 formed on the slider 3 and arranged in a plane perpendicular to the slider surface 4. In a magnetic disk drive of CSS (contact start stop) type, the magnetic head 1, or exactly, an end portion of the magneto-resistive effect element 5 is flown by a very small amount over the surface of the disk 2 utilizing the dynamic pressure caused by the rotation of the disk 2 making up a magnetic recording medium thereby to write (record) or read (reproduce) information into or from the disk 2. In the process, the gap between the surface of the disk 2 and the magneto-resistive effect element 5 is defined as the flying height h. The smaller the flying height h, the higher the recording or reproduction efficiency.

Figure 2:
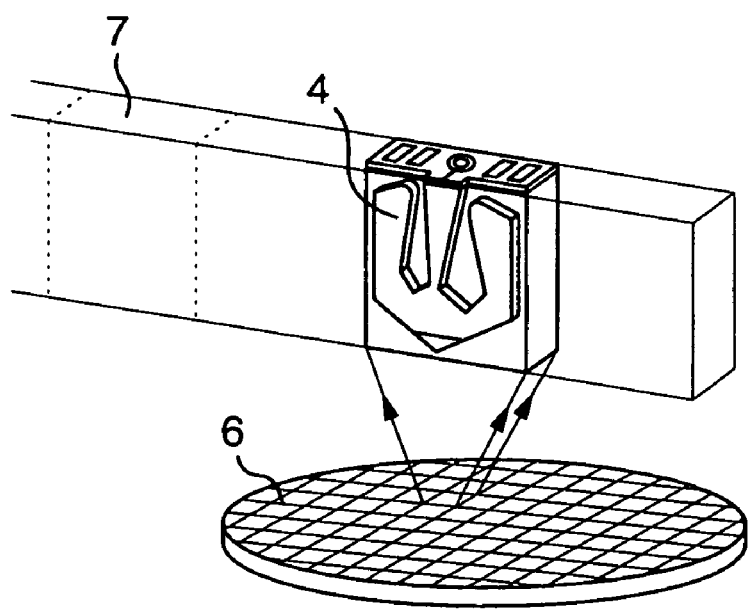
FIG. 2 is a schematic diagram for explaining the process for manufacturing a magnetic head.

The magnetic head 1 will be explained with reference to the structure shown in FIG. 2. In FIG. 2, inductive elements 10 and the magneto-resistive effect elements 5 are formed on the surface of a substrate 6 formed of a non-magnetic material such as Al2O3-TiC or SiC by the thin-film forming process such as the well-known sputtering method, the photolithography process, the etching process, and the like. The resulting assembly is cut into stripes thereby to form a row bar 7 having a plurality of magnetic heads. Further, the row bar 7 is cut to complete a magnetic head 1. In the process, a part of the substrate 6 cut to include the inductive element 10 and the magneto-resistive effect element 5 constitutes the slider 3. A surface of the slider 3 perpendicular to another surface formed with the inductive element 10 and the magneto-resistive effect element 5 functions as an air-bearing surface 4.

Figure 3:
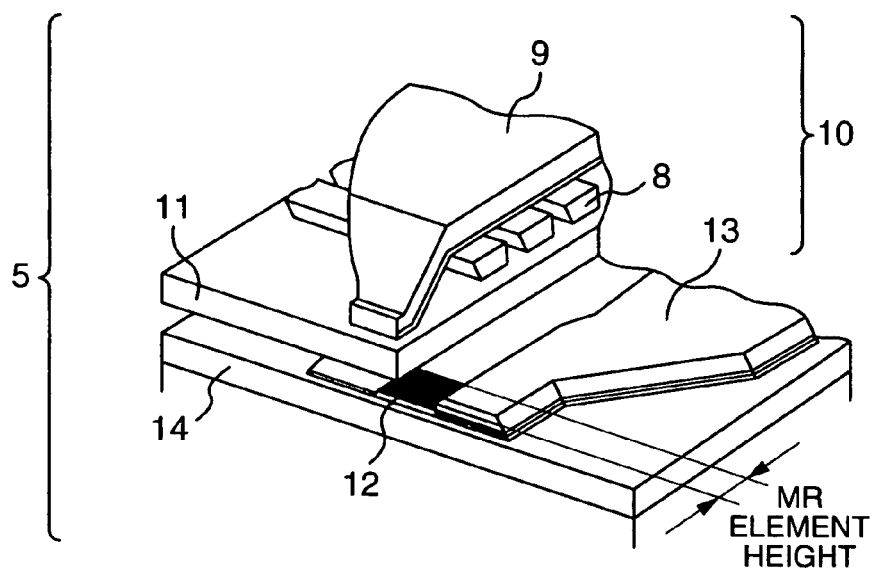
FIG. 3 is a perspective view for explaining the structure of a magnetic head.

FIG. 3 is a perspective view showing a structure of an element unit (the inductive element 10 and the magneto-resistive effect element 5) of the magnetic head 1. The inductive element 10 includes a coil 8, an upper magnetic film 9 and an upper shield 11, and an end portion of the upper magnetic film 9 is arranged in such a manner as to be exposed to substantially the same plane as the air-bearing surface of the slider 3. The information is recorded in the disk 2 using this exposed portion.

The magneto-resistive effect element 5 is arranged in the vicinity of the inductive element 10. An electrode 13 is formed in such a position as to be sandwich a magneto-resistive effect film 5 between the electrode 13 and the magneto-resistive effect element 5. In order to reduce the noise generated when reproducing the information recorded in the disk 2 using the magneto-resistive effect element 5, the magneto-resistive effect film 12 and the electrode 13 are sandwiched between the upper shield 11 and the lower shield 14.

Like the inductive element 10, an end portion of the magneto-resistive effect film 12 is arranged in such a manner as to be exposed to substantially the same plane as the air-bearing surface of the slider 3. The higher the reproduction efficiency of the recorded information, the smaller the height from the end portion of the magneto-resistive effect element 12 along the direction substantially perpendicular to the air-bearing surface 4 of the slider 3, i.e. the height of the magneto-resistive effect film 12 (called "the MR element height"). When the air-bearing surface 4 of the slider 3 is lapped, therefore, the end portion of the magneto-resistive effect film 12 is also lapped. The accuracy of this lapping process controls the performance of the magneto-resistive effect element 5. Therefore, a very accurate MR element height is required to be secured by machining.

The write and read operation (recording and reproduction) of the magnetic disk drive using the magnetic head 1 is performed in the following way:

(1) The required information is recorded in the disk 2 by magnetizing the surface of the disk 2 using the coil 8 and the upper magnetic film 9.

(2) Upon the relative movement of the surface of the magnetized disk 2 and the magnetic head 1, the resistance value of the magneto-resistive effect film 12 changes according to the polarity of the magnetic poles S and N written in the disk 2. By detecting this change in the resistance value, the information written in the surface of the disk 2 is reproduced.

As described above, when using the magnetic head 1 having the magneto-resistive effect element 5, it is very important to perform the lapping process very accurately to secure the MR element height, i.e. the height from the end portion of the magneto-resistive effect film 12 located in substantially the same plane as the air-bearing surface of the slider 3 in the direction substantially perpendicular to the air-bearing surface 4. A method of performing the lapping process with a very high accuracy while controlling the MR element height will be explained.

Figure 4:
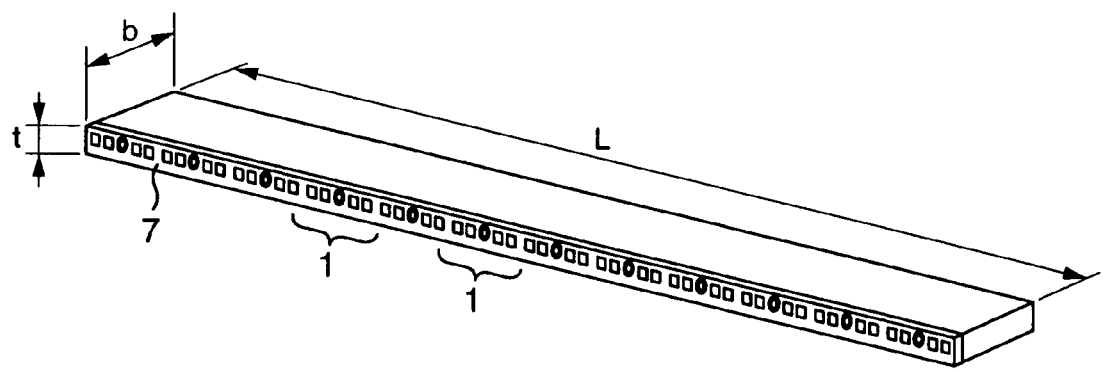
FIG. 4 is a schematic diagram showing a row bar for explaining a chain of the magnetic heads.
Figure 5:
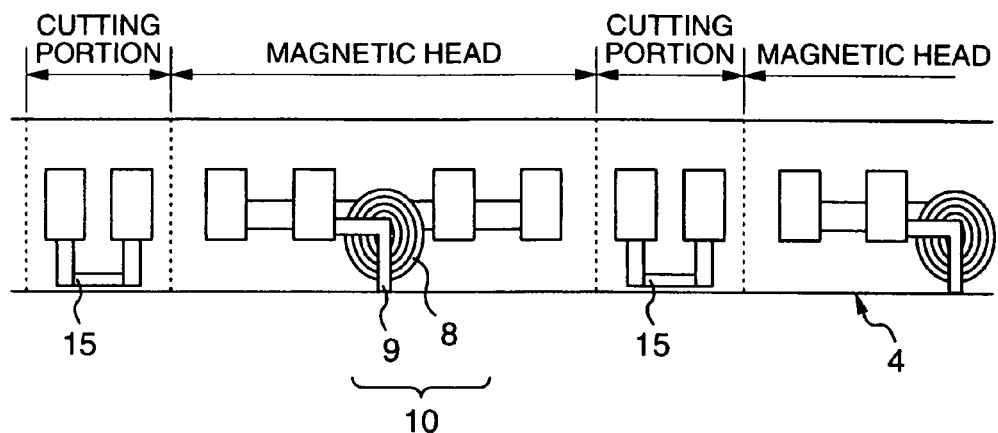
FIG. 5 is a schematic diagram showing the row bar in enlarged form for explaining the same.

FIG. 4 shows the external appearance of the generally well-known row bar 7. As an example, the row bar 7 is in such a shape that scores of magnetic heads 1 are arranged in chain. Each air-bearing surface 4 making up the slider 3 when the individual magnetic heads 1 are cut off is lapped in the state of the row bar together with the magneto-resistive effect element 5. As illustrated in FIG. 5, each cutting portion formed between the magnetic heads 1 of the row bar 7 is generally provided with an electric lapping guide element 15 for detecting the MR element height at the time of lapping. The change in resistance value is detected by the electric lapping guide element 15 when a part thereof is removed by lapping the air-bearing surface 4, and the detected resistance value is converted to the MR element height, thereby monitoring the distribution of the MR element height in the row bar 7. At the same time, the lapping load imposed on the row bar 7 is adjusted using the resistance values detected by a plurality of the electric lapping guide elements 15 to assure a uniform distribution of the MR element height.

The magnetic head mainly used currently has such a size that it is called a pico slider. The outer dimensions of the magnetic head 1 are 1.2 mm wide, 1.0 mm long and 0.3 mm high. In the state of the row bar 7 shown in FIG. 4, on the other hand, the width (b) is 1.2 mm, the length (L) is 40 to 80 mm, and the height (t) is 0.30 to 0.33 mm. The row bar 7 is very long as compared with the width and the height thereof is by reason of the fact that the greater length of the row bar 7 makes it possible to increase the number of the magnetic heads 1 included in a single row bar 7, which in turn can improve the productivity of the magnetic heads 1.

In lapping the row bar 7, however, the greater length reduces the stiffness thereof and the component (called the swell component) higher in order than the quadratic curve component and the tertiary curve component are liable to be generated in the row bar 7. The quadratic curve component can be corrected with comparative ease by detecting the resistance values of the electric lapping guide elements 15 in the row bar 7 and appropriately adjusting the load imposed on the row bar 7 based on the particular resistance values. The swell component, however, cannot be easily corrected.

The factors causing the variations of the MR element height of individual magnetic heads 1 completed in the conventional method were described above with reference to the problems to be solved by the invention. Especially, the factors (1) to (3) and (6) are caused by the fact the swell component in the row bar 7 cannot be sufficiently corrected in the case where the air-bearing surface is lapped in the form of row bar 7. For improving the accuracy of the MR element height, therefore, it is essential to suppress the swell component of the MR element height in the row bar in the step before lapping the air-bearing surface.

Embodiments of the invention will be described in detail below with reference to the drawings.

In the case where the air-bearing surface 4 is lapped in the form of the row bar as shown in FIG. 4 while at the same time controlling the MR element height, the variations unique to the shape of the row bar are caused. In view of this, according to this invention, each slider instead of the row bar is lapped in order to eliminate the factors of the variations. Specifically, the resistance value of each slider is detected using the electric lapping guide element provided for each slider, and the result is fed back to the lapping conditions as required to proceed with the lapping process.

Figure 6:
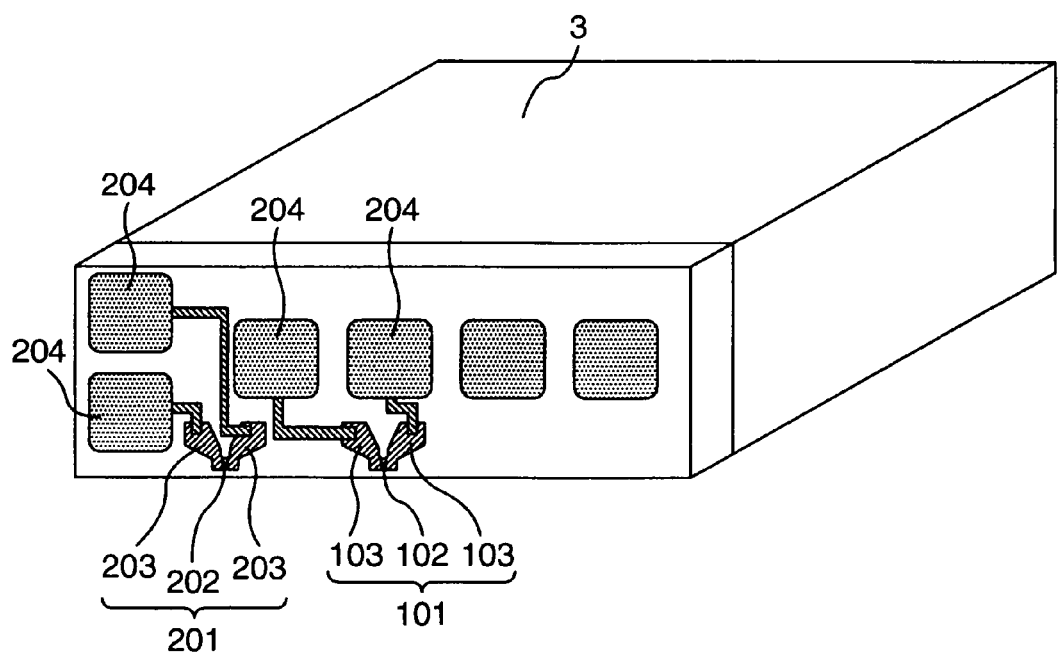
FIG. 6 is a perspective view for explaining the structure of a magnetic head according to an embodiment of this invention.
Figure 7:
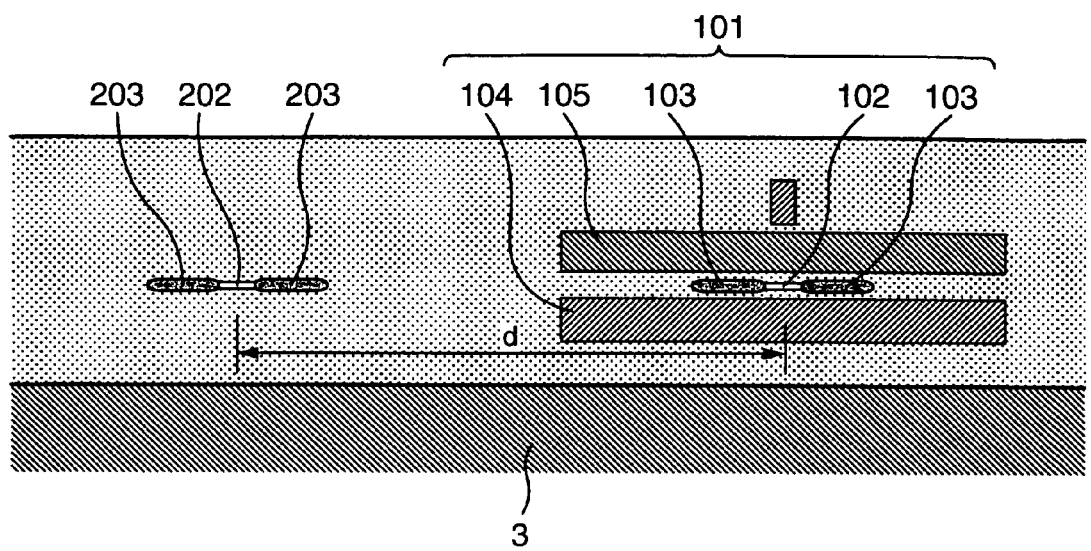
FIG. 7 is a diagram showing the sectional structure of a magnetic head according to an embodiment of this invention.

A perspective view of the magnetic head according to an embodiment of the invention is shown in FIG. 6, and a schematic sectional view of the magnetic head as taken from the air-bearing surface with the end portion of the magneto-resistive effect element exposed to the air-bearing surface is shown in FIG. 7. The magnetic head is formed by a method similar to the one shown in FIGS. 2 to 5. Nevertheless, the difference from the conventional method lies in the following. Specifically, the slider 3 cut off from the row bar is formed with a first magneto-resistive effect element 101 and a second magneto-resistive effect element 201 in proximity to each other. The first magneto-resistive effect element 101 and the second magneto-resistive effect element 201 include first electrodes 103 and second electrodes 203, respectively, formed by being brought into contact with a part of a first magneto-resistive effect film 102 and a part of a second magneto-resistive effect film 202, respectively, in such a manner as to hold each the first and second magneto-resistive effect films from the two sides thereof. These component parts are stacked on the substrate 3 (the slider 3 after being cut off) having an insulating film 301.

The first magneto-resistive effect film 102 and the first electrodes 103 are formed in the same geometric shape using the same material as the second magneto-resistive effect film 202 and the second electrodes 203, respectively. The second magneto-resistive effect film 202 is formed in the same plane as the first magneto-resistive effect film 102. Further, the first magneto-resistive effect element 101 has a lower shield film 104 and an upper shield film 105 formed in such a manner as to sandwich the first magneto-resistive effect film 102 and the first electrodes 103. The distance d between the first magneto-resistive effect element 101 and the second magneto-resistive effect element 201 is desirably as small as possible taking the dimensional error of the photomask and the error in the photography process into consideration.

The inductive element 10 for recording information in the disk 2 is formed above the first magneto-resistive effect element 101 through the upper shield film 105. The structure of the inductive element 10 and the method of forming it are similar to those for the conventional one, and therefore will not be described below.

Now, the process of lapping the air-bearing surface of the slider will be explained. FIG. 8B shows a machining process flow according to this embodiment in comparison with the prior art shown in FIG. 8A.

(1) The substrate 6 having the first magneto-resistive effect elements 101, the second magneto-resistive effect elements 201 and the inductive elements 10 is cut into the shape of the row bar 7.

(2) A surface of the substrate 6 perpendicular to another surface thereof formed with the first magneto-resistive effect elements 101 and the second magneto-resistive effect elements 201 is roughly polished by the method called the double side lapping to machine the particular surface to a predetermined MR element height.

(3) Further, under this condition, the air-bearing surfaces 4 of the sliders 3 are lapped to machine the MR element height almost to a predetermined value. Specifically, assuming that the MR element height of a completed magnetic head is Hf, the target value Hb of this lapping process is about Hf+(0.03 to 0.15 μm). The process up to this point is the same as the corresponding process of the prior art.

(4) The row bar 7 is cut off in such a manner that the first magneto-resistive effect element 101 and the second magneto-resistive effect element 201 are included in each slider.

(5) The slider is mounted on the lapping machine, and the air-bearing surface 4 is lapped while detecting the resistance value of the second magneto-resistive effect element 201 for each slider and feeding back the result thereof to the lapping machine. This lapping process is continued until the resistance value described above or the MR element height converted from the resistance value reaches Hf.

(6) Then, according to this embodiment, an air-bearing rail is formed on the air-bearing surface 4 by the well-known ion milling method or the sputtering method.

In the prior art, on the other hand, instead of the process described in (3) above, the air-bearing surface is machined in the form of the row bar, and the lapping process is continued until the resistance value of the second magneto-resistive effect elements 201 or the MR element height converted from the particular resistance value reaches Hf. In view of the fact that the lapping work is carried out on the row bar having scores of the magneto-resistive effect elements in chain, however, it is impossible to impose the required lapping load only on a particular slider portion even if the resistance value of the second magneto-resistive effect elements is detected and the result of detection is fed back to the lapping machine. In this case, therefore, a very large variation is unavoidably caused with respect to the target MR element height Hf.

Figure 9:
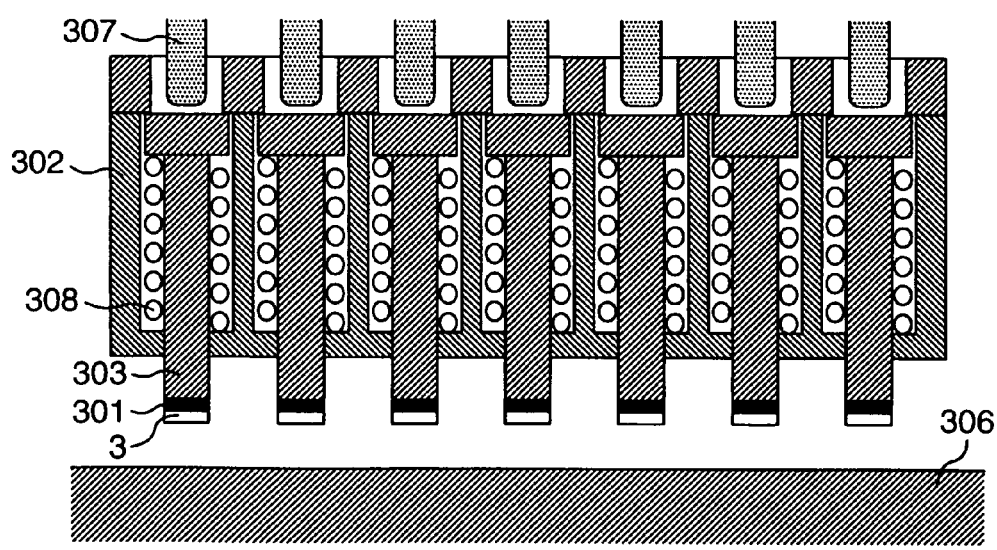
FIG. 9 is a schematic diagram showing a machine (before the lapping operation) for lapping each slider separately according to an embodiment of this invention.
Figure 10:
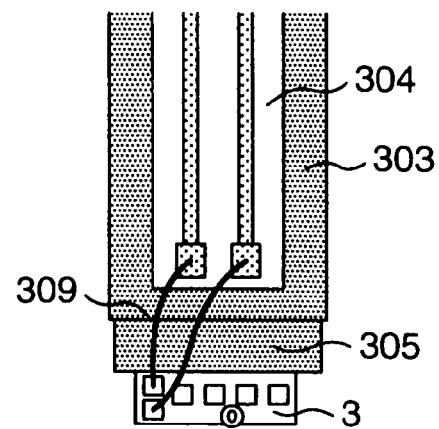
FIG. 10 is a diagram showing, in enlarged form, a slider mounting portion of the lapping machine.

Now, the high-accuracy lapping process for the air-bearing surface in (6) above will be explained with reference to FIGS. 9 to 12. FIG. 9 is a schematic diagram showing the lapping machine used in this embodiment. FIG. 10 is a schematic diagram showing the slider 3 having the first magneto-resistive effect element 101 and the second magneto-resistive effect element 201 mounted on the lapping machine. In these diagrams, an adhesive elastic member 301 such as polyurethane is attached on the reverse surface of the slider 3 (the surface to which the first magneto-resistive effect film 103 and the second magneto-resistive effect film 203 are not exposed), and the resulting assembly is fixed on a vertical cylinder 303 of a lapping jig 302. As shown in FIG. 10, the vertical cylinder 303 has mounted thereon film-like circuit boards 304, for example. The terminals 305 of the film-like circuit boards 304 and the terminals 204 of the second magneto-resistive effect element 201 shown in FIG. 6 are connected by wires 309 using the wire bonding method, for example. In this way, the resistance value of the second magneto-resistive effect element 201 can be detected during the lapping process.

In the embodiment shown in FIG. 9, the lapping jig 302 having a plurality of the sliders 3 fixed thereon is mounted on the lapping machine in such a position that the air-bearing surface 4 of each slider 3 and the lapping stool 306 are in opposed relation to each other. Before starting the lapping process, the actuator 307 and the vertical cylinder 303 are out of contact with each other, and the vertical cylinder 303 is urged up by a coil spring 308, for example. Therefore, the slider surface 4 and the lapping stool 306 are out of contact with each other.

Figure 11:
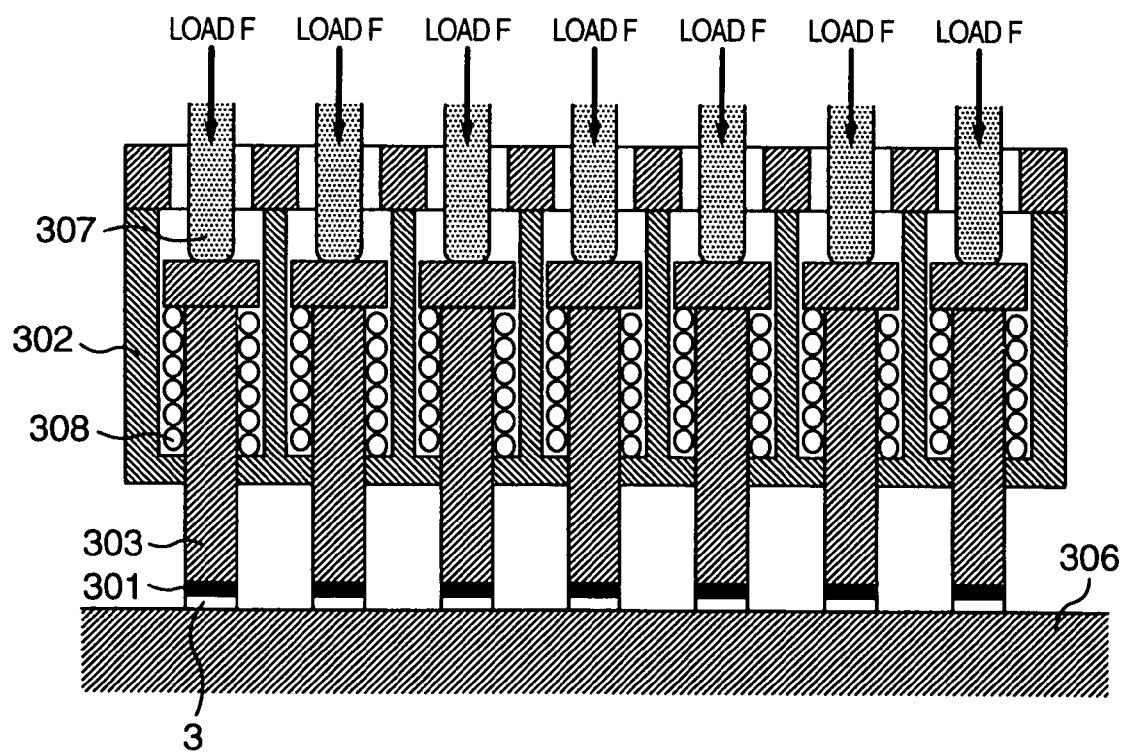
FIG. 11 is a schematic diagram showing a machine (in lapping operation) for lapping each slider separately according to an embodiment of this invention.

FIG. 11 is a diagram showing each slider 3 being lapped. A load F is imposed on the vertical cylinder 303 using the actuator 24, thereby bringing the air-bearing surface 4 of the slider 3 and the surface of the lapping stool 306 into contact with each other. Under this condition, the lapping stool 306 is rotated whereas the lapping jig 302 is reciprocated along the diameter of the lapping stool 306 or along the direction perpendicular to the diameter thereby to lap the air-bearing surface 4. Diamond grinding stones suitable for lapping the air-bearing surface 4 are buried in the surface of the lapping stool 306.

Figure 12:
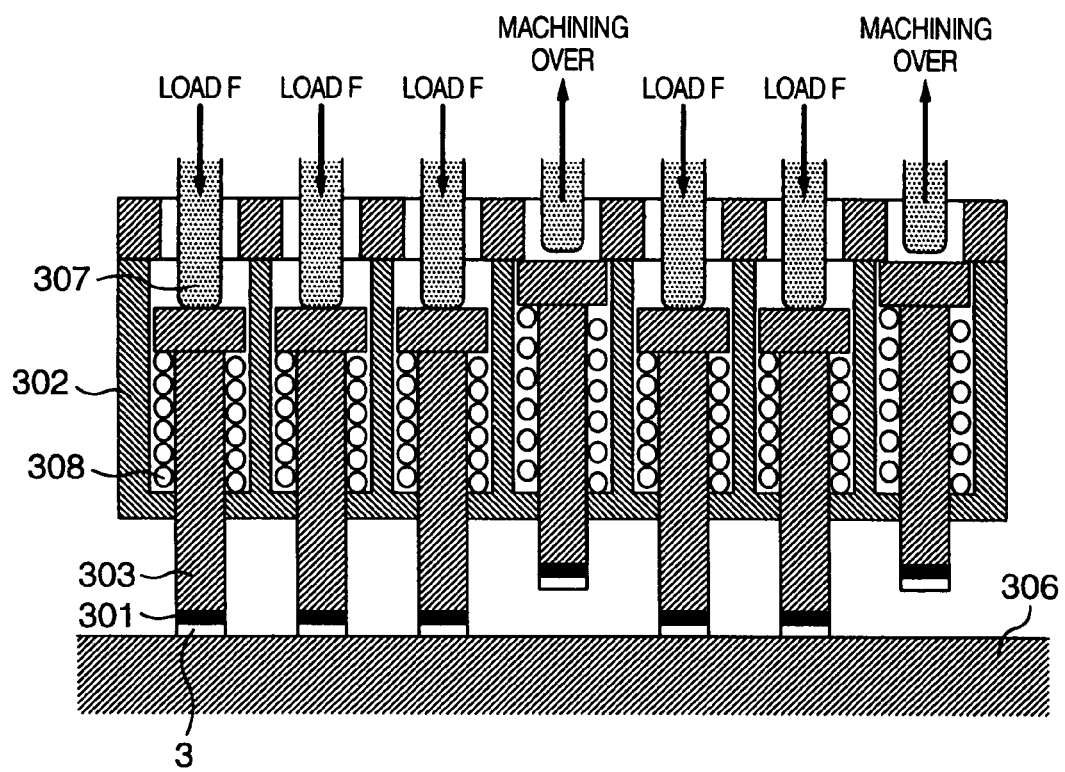
FIG. 12 is a schematic diagram showing a machine (after the lapping operation) for lapping each slider separately according to an embodiment of this invention.

During the lapping operation, the resistance value of the second magneto-resistive effect film 202 is measured appropriately or according to a predetermined schedule using the second magneto-resistive effect element 201 arranged on the slider 3, and the result of measurement is fed back to the actuator 307. As shown in FIG. 12, when the resistance value measured using the second magneto-resistive effect element 202 or the MR element height converted from the particular resistance value has reached a predetermined value, the actuator 307 which has thus far imposed the lapping load on the slider 4 is activated in the opposite direction. In this way, the load imposed on the vertical cylinder 303 is reduced to zero so that the vertical cylinder 303 is pushed up by the restitutive power of the coil spring 308 (see the lapping jig on the extreme right and the fourth lapping jig in FIG. 12).

In this way, a magnetic head 1 is completed which has a predetermined value of the resistance of the second magneto-resistive effect element 202 formed in the slider 3 or the MR element height converted from the particular resistance value. As seen from the embodiment of FIG. 12, a plurality of sliders 3 are lapped collectively, and the lapping process is terminated sequentially for those sliders 3 of which the MR element height has reached a predetermined value. The sliders 3 of which the MR element height fails to reach a predetermined value continue to be lapped. Upon complete lapping of all the sliders 3 mounted on the lapping jig 302, the rotation of the lapping stool 306 and the reciprocating motion of the lapping jig 302 are stopped thereby to complete the lapping process.

As described above, the method of lapping according to this embodiment has the following effects and makes possible the lapping process which can secure a very accurate MR element height.

(1) The lapping process is carried out for each slider utilizing the characteristics of the magneto-resistive effect element provided for each slider, and therefore the variations of the machining amount caused by the lapping process executed for each row bar in the prior art can be reduced.

(2) The lapping process is carried out for each slider, and therefore can be independently controlled.

(3) The first magneto-resistive effect element (for write and read operation) and the second magneto-resistive effect element (for monitoring the lapping process) are formed in proximity to each other in the slider, and therefore the variations of the machining amount caused by the distance between the two elements can be reduced.

(4) The use of the lapping process monitor element having the same material and the same shape as the magneto-resistive effect film for the write/read operation and the electrodes making up the magneto-resistive effect element for write and read operation makes it substantially possible to lap the magneto-resistive effect element for the write/read operation.

(5) The magneto-resistive effect element for monitoring the lapping process has no shield film, and therefore the noise caused by scratch at the time of lapping can be reduced and the resistance value can be measured with high sensitivity. Specifically, suppose that a shield film exists or the lapping amount is measured using the magneto-resistive effect element for the write/read operation. The interval of the shield films formed to sandwich the magneto-resistive effect film and the electrodes is at most about 80 to 100 nm. Therefore, the resistance value to be detected is measured as a smaller value than the original resistance value due to the shorting between the shield film and the electrodes caused by the scratch generated during the lapping process. This makes correct lapping impossible and causes considerable variations of the MR element height.

Now, the result of the lapping process carried out according to this embodiment will be explained.

Figure 13:
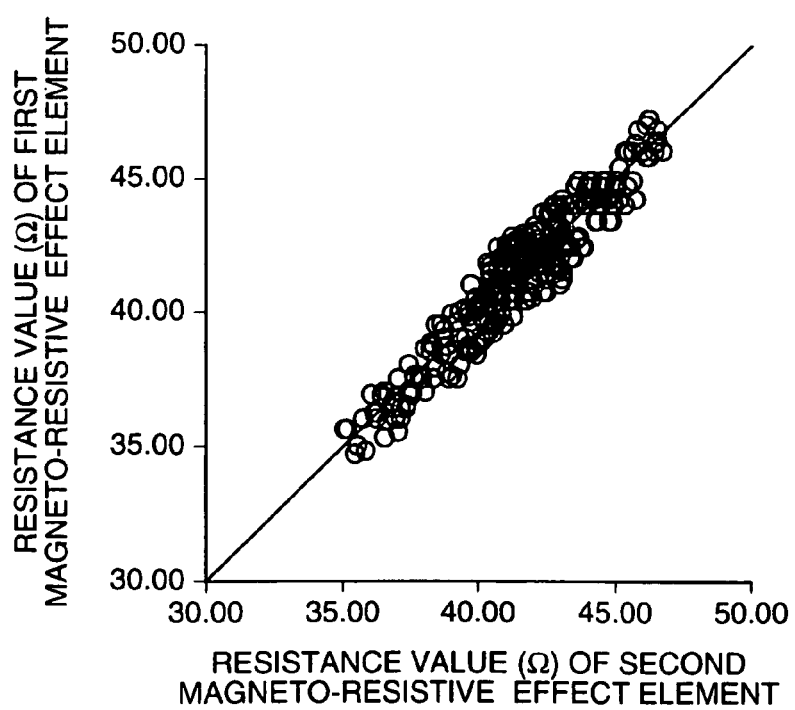
FIG. 13 shows the correlation of the resistance value between the first and second magneto-resistive effect elements.

FIG. 13 shows the result of measuring the resistance value of the first magneto-resistive effect element 101 at the end of the lapping process carried out while detecting the resistance value of the second magneto-resistive effect element 201 provided for each slider. This apparently shows that the resistance values of the first magneto-resistive effect element 101 and the second magneto-resistive effect element 201 formed in the slider have a very satisfactory correlation.

This is indicative of the fact that a highly accurate value of the resistance of the first magneto-resistive effect element 201, i.e. the resistance of the magneto-resistive effect element or the MR element height for the actual magnetic head can be secured by carrying out the lapping process while monitoring the resistance value of the second magneto-resistive effect element 201 arranged in proximity to the first magneto-resistive effect element 101 in the slider.

Figure 14A:
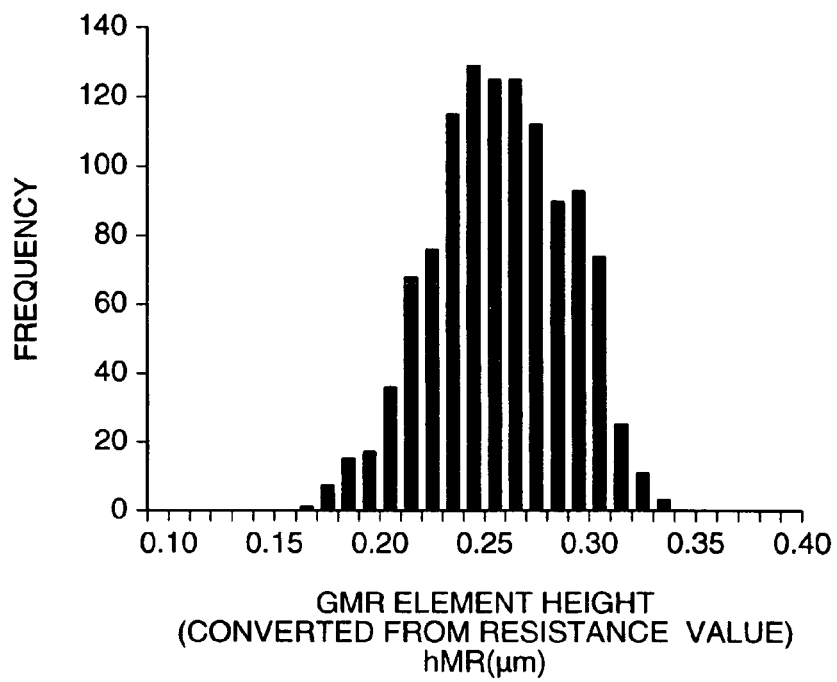
FIGS. 14A and 14B are diagrams showing the distribution of the GMR element height (converted from the resistance value) according to the prior art and an embodiment of the invention, respectively.
Figure 14B:
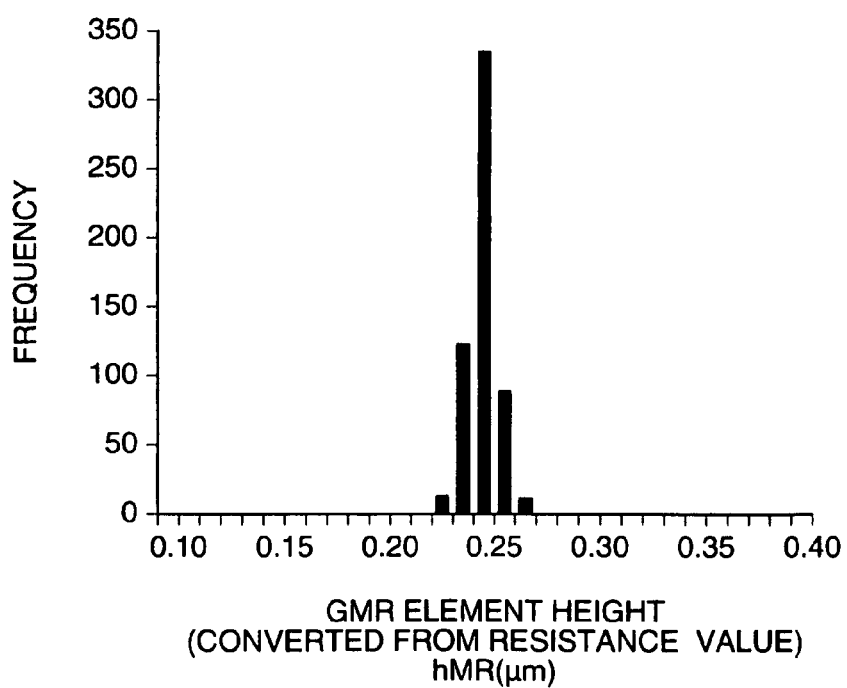

FIG. 14A is a diagram showing the distribution of the MR element height (converted from the resistance value) of the magnetic head produced by lapping the air-bearing surface in the form of row bar and cutting the row bar into sliders according to the prior art. FIG. 14B is a diagram showing the distribution of the MR element height (converted from the resistance value) produced by carrying out the lapping process for each slider according to this embodiment. As apparent from these diagrams, the MR element height according to the prior art has an average value of 0.26 µm, the maximum value of 0.34 µm, the minimum value of 0.17 µm and the variation (3σ value) of 0.02 µm, which compares with the MR element height according to this embodiment having an average value of 0.25 µm, the maximum value of 0.27 µm, the minimum value of 0.23 µm and the variation (3σ value) of 0.02 µm. In other words, the use of the structure (FIG. 6) of the magnetic head and the lapping process (FIG. 12) carried out for each slider according to the embodiments described above makes it possible to fabricate a magnetic head indispensable for realizing the magnetic disk drive having a high areal density.

Figure 15A:
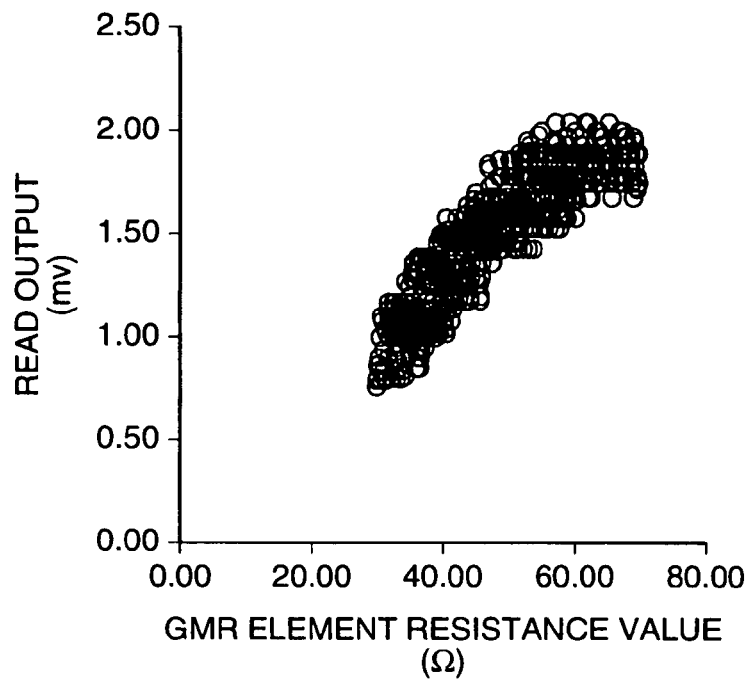
FIGS. 15A and 15B are diagrams showing the relation between the resistance value of a GMR element and the read output according to the prior art and an embodiment of this invention, respectively.
Figure 15B:
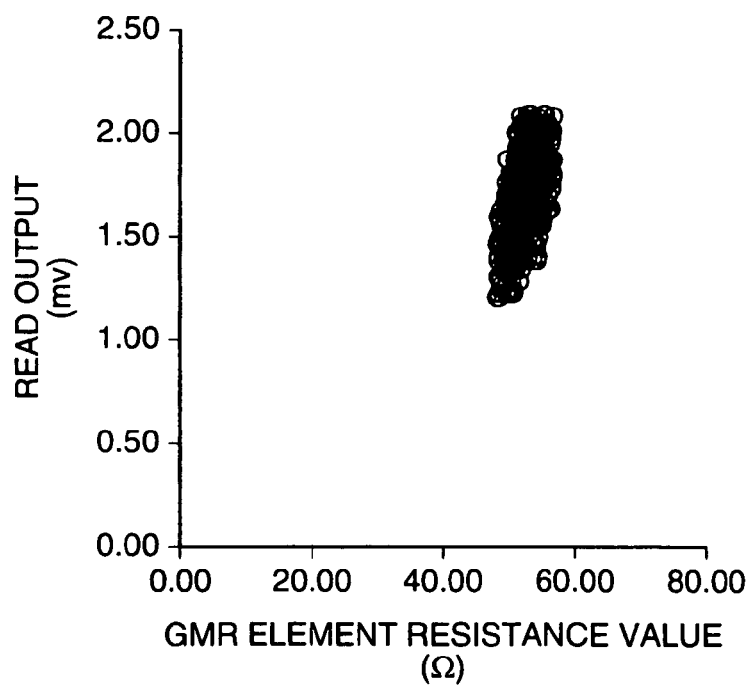

FIG. 15A shows the relation between the read output of the magnetic head and the resistance value of the GMR element according to the prior art, and FIG. 15B the corresponding relation according to this embodiment. In the prior art, as shown in FIG. 14A, the variations of the MR element height are so large that the resistance value of the MR element and the read output are distributed over a wide range. In this embodiment, on the other hand, as shown in FIG. 14B, the variations of the MR element height can be minimized and therefore the variations of the resistance value of the GMR element and the read output can also be reduced. As a result, it is not too much to say that according to this invention, there is provided a magnetic head having a high reliability with a stable read output which is one of the important characteristics of the magnetic head.

As described above, a magnetic head having a MR element height controlled with high accuracy is implemented by forming a magneto-resistive effect element for the write/read operation and a magneto-resistive effect element for detecting the lapping amount and by lapping each slider while monitoring the lapping amount.

It will be further understood by those skilled in the art that the foregoing description has been made on embodiments of the invention and that various changes and modifications may be made in the invention without departing from the spirit of the invention and scope the appended claims.

The invention claimed is:

1. A thin-film magnetic head comprising:
   a substrate;
   an insulating film formed on said substrate;
   a first magneto-resistive effect element for detecting a magnetic signal from a magnetic recording medium comprising:
      a first electrode;
      a second electrode;
      a first magneto-resistive effect film disposed between said first electrode and said second electrode and formed on said insulating film so as to hold said first magneto-resistive effect element between an upper shield film and a lower shield film;
   a second magneto-resistive effect element disposed adjacent to said first magneto-resistive effect element for measuring an amount of lapping of said first magneto-resistive effect element along an air bearing surface, said second magneto-resistive effect element consisting essentially of:
      a third electrode;
      a fourth electrode; and
      a second magneto-resistive effect film disposed between said third electrode and said fourth electrode and formed on said insulating film; and
   wherein a first distance between said substrate and said first magneto-resistive film is the same as a second distance between said substrate and said second magneto-resistive film; and
   wherein a first thickness of said insulating film where said second magneto-resistive effect element is formed is larger than a second thickness of said insulating film in the region where said first magneto-resistive effect element is formed.

2. The thin-film magnetic head according to claim 1, wherein a shape of electrodes for said second magneto-resistive effect film is substantially similar to that of said first magneto-resistive effect film.

3. The thin-film magnetic head according to claim 1, wherein a shape of said second magneto-resistive effect film is substantially similar to that of said first magneto-resistive effect film.

4. The thin-film magnetic head according to claim 1, wherein said second magneto-resistive effect film is a metal film.

5. A thin-film magnetic head comprising:
   a substrate having an insulating film;
   a first magneto-resistive effect element for detecting a magnetic signal from a magnetic recording medium, said first magneto-resistive effect element comprising:
      a first electrode;
      a second electrode;
      a first magneto-resistive effect film disposed between said first electrode and said second electrode and formed on said insulating film so as to hold said first magneto-resistive effect element between an upper shield and a lower shield film;
   a second magneto-resistive effect element disposed adjacent to said first magneto-resistive effect element along an air-bearing surface, said second magneto-resistive effect element comprising:
      a third electrode;
      a fourth electrode;
      a second magneto-resistive effect film disposed between said third electrode and said fourth electrode and formed on said insulating film,
   wherein a first distance between said substrate and said first magneto-resistive film is the same as a second distance between said substrate and said second magneto-resistive film; and
   wherein a first thickness of said insulating film where said second magneto-resistive effect element is formed is larger than a second thickness of said insulating film in the region where said first magneto-resistive effect element is formed.

6. The thin-film magnetic head according to claim 5, wherein electrodes of the second magneto-resistive effect film have substantially the same shape as electrodes of the first magneto-resistive effect film.

7. The thin-film magnetic head according to claim 5, wherein the second magneto-resistive effect film has substantially the same as shape as the first magneto-resistive effect film.

8. The thin-film magnetic head according to claim 5, wherein the second magneto-resistive effect film is a metal film.

* * * * *

UNITED STATES PATENT AND TRADEMARK OFFICE
CERTIFICATE OF CORRECTION

PATENT NO. : 7,268,976 B2  
APPLICATION NO. : 11/519644  
DATED : September 11, 2007  
INVENTOR(S) : Hideo Yamakura et al.

It is certified that error appears in the above-identified patent and that said Letters Patent is hereby corrected as shown below:

On the title page, item [73] should read:

-- (73) Assignee: Hitachi Global Storage Technologies Japan, Ltd., Kanagawa (JP) --

Signed and Sealed this

Eleventh Day of November, 2008

JON W. DUDAS  
*Director of the United States Patent and Trademark Office*